US012084736B2

(12) United States Patent
Kwon et al.

(10) Patent No.: US 12,084,736 B2
(45) Date of Patent: Sep. 10, 2024

(54) GRAIN-ORIENTED ELECTRICAL STEEL SHEET AND MANUFACTURING METHOD THEREFOR

(71) Applicant: POSCO, Pohang-si (KR)

(72) Inventors: Oh-Yeoul Kwon, Pohang-si (KR); Woo-Sin Kim, Pohang-si (KR); Dae-Uk Kim, Pohang-si (KR); Jong-Tae Park, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 81 days.

(21) Appl. No.: 17/415,824

(22) PCT Filed: Dec. 18, 2019

(86) PCT No.: PCT/KR2019/018028

§ 371 (c)(1),
(2) Date: Jun. 18, 2021

(87) PCT Pub. No.: WO2020/130641

PCT Pub. Date: Jun. 25, 2020

(65) Prior Publication Data

US 2022/0042124 A1 Feb. 10, 2022

(30) Foreign Application Priority Data

Dec. 19, 2018 (KR) ........................ 10-2018-0165642

(51) Int. Cl.
*C21D 8/12* (2006.01)
*H01F 1/16* (2006.01)
(Continued)

(52) U.S. Cl.
CPC ......... *C21D 8/1233* (2013.01); *C21D 8/1272* (2013.01); *C21D 8/1283* (2013.01);
(Continued)

(58) Field of Classification Search
CPC ... C21D 8/1233; C21D 8/1272; C21D 8/1283
See application file for complete search history.

(56) References Cited

U.S. PATENT DOCUMENTS 4,904,312 A 2/1990 Beckley et al.
11,180,819 B2 * 11/2021 Kwon .................. B23K 26/364
(Continued)

FOREIGN PATENT DOCUMENTS

CN 104726760 A 6/2015
CN 107109511 A 8/2017
(Continued)

OTHER PUBLICATIONS

Mizumura Takahito, et. al. [JP2017095745A] [ Text from Machine Translation] (Year: 2017).*
(Continued)

*Primary Examiner* — Brian D Walck
*Assistant Examiner* — Nazmun Nahar Shams
(74) *Attorney, Agent, or Firm* — Morgan, Lewis & Bockius LLP

(57) ABSTRACT

A manufacturing method of a grain-oriented electrical steel sheet according to an embodiment of the present invention includes: manufacturing a cold-rolled sheet; forming a groove in the cold-rolled sheet; removing an Fe—O oxide formed on a surface of the cold-rolled sheet; primary recrystallization annealing the cold-rolled sheet; and applying an annealing separating agent to the primary recrystallized cold-rolled sheet, and secondary recrystallization annealing it, wherein a close contacting property coefficient calculated by Formula 1 below is 0.016 to 1.13.

$$\text{close contacting property coefficient } (S_{ad})=(0.8\times R)/H_{hill\text{-}up} \quad \text{[Formula 1]}$$

(In Formula 1, R represents the average roughness (μm) of the surface of the cold-rolled sheet after the removing of the
(Continued)

oxide, and $H_{hill\text{-}up}$ represents the average height (μm) of the hill-up present on the surface of the cold-rolled sheet after the removing of the oxide.).

7 Claims, 3 Drawing Sheets

(51) Int. Cl.
*H01F 27/245* (2006.01)
*H01F 41/02* (2006.01)

(52) U.S. Cl.
CPC .......... *H01F 1/16* (2013.01); *H01F 27/2455* (2013.01); *H01F 41/024* (2013.01)

(56) References Cited

U.S. PATENT DOCUMENTS

| | | | | |
|---|---|---|---|---|
| 2018/0010206 | A1* | 1/2018 | Kwon | C22C 38/001 |
| 2020/0283863 | A1* | 9/2020 | Senda | H01F 1/147 |

FOREIGN PATENT DOCUMENTS

| | | | |
|---|---|---|---|
| CN | 108431245 | A | 8/2018 |
| CN | 108474054 | A | 8/2018 |
| JP | 2004-238734 | A | 8/2004 |
| JP | 2007-262431 | A | 10/2007 |
| JP | 2010-196081 | A | 9/2010 |
| JP | 2016-145419 | A | 8/2016 |
| JP | 6015919 | B2 | 10/2016 |
| JP | 2017-095745 | A | 6/2017 |
| JP | 2017-145506 | A | 8/2017 |
| JP | WO2016/171130 | A1 | 12/2017 |
| JP | 2018-508647 | A | 3/2019 |
| KR | 10-2012-0127666 | A | 11/2012 |
| KR | 10-2015-0074932 | A | 7/2015 |
| KR | 10-2016-0078104 | A | 7/2016 |
| KR | 10-2016-0078242 | A | 7/2016 |
| KR | 10-2016-0078247 | A | 7/2016 |
| KR | 101636191 | B1 | 7/2016 |
| KR | 101693516 | B1 | 1/2017 |
| KR | 101693529 | B1 | 1/2017 |
| KR | 101751525 | B1 | 7/2017 |
| KR | 10-2018-0073306 | A | 7/2018 |
| KR | 10-2018-0073343 | A | 7/2018 |
| KR | 10-2018-0074388 | A | 7/2018 |
| WO | 2016/105055 | A1 | 6/2016 |
| WO | 2017/171013 | A1 | 10/2017 |
| WO | 2018/177007 | A1 | 10/2018 |

OTHER PUBLICATIONS

Kwon Oh Yeoul [KR20160078104A] [Text from Machine Translation]. (Year: 2016).*
Kwon Oh Yeoul [KR20160078247A] [ Text from Machine Translation and Figure from original document] (Year: 2016).*
Written Opinion and International Search Report dated Apr. 14, 2020 issued in International Patent Application No. PCT/KR2019/018028 (with English translation).
Extended European Search Report dated Feb. 9, 2022 issued in European Patent Application No. 19900374.0.
Chinese Search Report dated Mar. 23, 2023 issued in Chinese Patent Application No. 2019800850632.
Chinese Office Action dated May 11, 2023 issued in Chinese Patent Application No. 2019800850632.
Office Action issued in Japanese Patent Application 2021-536309 dated Mar. 14, 2023 with English Translation.
Sato et al., Heat-Proof Domain-Refined Grain-Oriented Electrical Steel, Kawasaki Steel Technical Report, 1997, p. 153-158, vol. 29, No. 3, Japan.
Chinese Notice of Allowance dated Nov. 21, 2023 issued in Chinese Patent Application No. 201980085063.2.

* cited by examiner

GRAIN-ORIENTED ELECTRICAL STEEL SHEET AND MANUFACTURING METHOD THEREFOR

CROSS-REFERENCE OF RELATED APPLICATIONS

This application is the U.S. National Phase under 35 U.S.C. § 371 of International Patent Application No. PCT/KR2019/018028, filed on Dec. 18, 2019, which in turn claims the benefit of Korean Application No. 10-2018-0165642, filed on Dec. 19, 2018, the entire disclosures of which applications are incorporated by reference herein.

TECHNICAL FIELD

The present invention relates to a grain-oriented electrical steel sheet and a manufacturing method thereof. More specifically, the present invention relates to a grain-oriented electrical steel sheet and a manufacturing method thereof that may improve magnetism and may improve close a contacting property to an insulating coating layer, by appropriately forming an island by removing an Fe—O oxide formed on a surface after forming a groove.

BACKGROUND ART

Since a grain-oriented electrical steel sheet is used as an iron core material of an electrical device such as a transformer, in order to improve energy conversion efficiency thereof by reducing power loss of the electrical device, it is necessary to provide a steel sheet having excellent iron loss of the iron core material and a high occupying ratio when being stacked and spiral-wound.

The grain-oriented electrical steel sheet refers to a functional material having a texture (referred to as a "GOSS texture") of which a secondary-recrystallized grain is oriented with an azimuth {110}<001> in a rolling direction through a hot rolling process, a cold rolling process, and an annealing process.

As a method of reducing the iron loss of the grain-oriented electrical steel sheet, a magnetic domain refining method is known. In other words, it is a method of refining a large magnetic domain contained in a grain-oriented electrical steel sheet by scratching or energizing the magnetic domain. In this case, when the magnetic domain is magnetized and a direction thereof is changed, energy consumption may be reduced more than when the magnetic domain is large. The magnetic domain refining methods include a permanent magnetic domain refining method, which improves magnetic properties to retain an effect thereof even after heat treatment, and a temporary magnetic domain refining method, which does not retain an improvement effect after heat treatment.

The permanent magnetic domain refining method in which iron loss is improved even after stress relaxation heat treatment at a heat treatment temperature or more at which recovery occurs may be classified into an etching method, a roll method, and a laser method. According to the etching method, since a groove is formed on a surface of a steel sheet through selective electrochemical reaction in a solution, it is difficult to control a shape of the groove, and it is difficult to uniformly secure iron loss characteristics of a final product in a width direction thereof. In addition, it has a drawback that may cause environmental pollution due to an acid solution used as a solvent.

The permanent magnetic domain refining method using a roll is a magnetic domain refining technology that provides an effect of improving iron loss that partially causes recrystallization at a bottom of a groove by forming the groove with a certain width and depth on a surface of a plate by pressing the roll or plate by a protrusion formed on the roll and then annealing it. The roll method is disadvantageous in stability in machine processing, in reliability due to difficulty in securing stable iron loss depending on a thickness, in process complexity, and in deterioration of the iron loss and magnetic flux density characteristics immediately after the groove formation (before the stress relaxation annealing).

The permanent magnetic domain refining method using a laser is a method in which a laser beam of high output is irradiated onto a surface portion of an electrical steel sheet moving at a high speed, and a groove accompanied by melting of a base portion is formed by the laser irradiation. However, these permanent magnetic domain refining methods also have difficulty in refining the magnetic domain to a minimum size.

Researches for the temporary magnetic domain refining method are being conducted in a direction of not performing coating once more after irradiating the laser beam in a coated state, and thus, the laser beam is not attempted to be irradiated with a predetermined intensity or higher. This is because when the laser is irradiated with a predetermined intensity or higher, it is difficult to properly obtain a tension effect due to damage to the coating.

Since the permanent magnetic domain refining method is to increase a free charge area that may receive static magnetic energy by forming a groove, a deep groove depth is required as much as possible. In addition, a side effect such as a decrease in magnetic flux density also occurs due to the deep groove depth. Therefore, in order to reduce the magnetic flux density deterioration, the groove is managed at an appropriate depth.

On the other hand, a grain-oriented electrical steel sheet manufactured by a magnetic domain refining technology is manufactured into products such as transformer cores through molding and heat treatment processes. In addition, since a product is used in a relatively high temperature environment, it is necessary to secure not only iron loss characteristics but also a close contacting property to the insulating coating layer.

DISCLOSURE

The present invention has been made in an effort to provide a grain-oriented electrical steel sheet and a manufacturing method thereof. More specifically, the present invention has been made in an effort to provide a grain-oriented electrical steel sheet and a manufacturing method thereof that may improve magnetism and may improve a close contacting property to an insulating coating layer, by appropriately forming an island by removing an Fe—O oxide formed on a surface after forming a groove.

An embodiment of the present invention provides a grain-oriented electrical steel sheet, including: a groove positioned on a surface of an electrical steel sheet, a metal oxide layer positioned on the groove, and metal oxide-based islands that are discontinuously distributed and positioned below the groove.

An average particle diameter of the islands positioned below the groove may be 0.5 to 5 μm.

A density of the islands positioned below the groove may be 0.5 pieces/$\mu m^2$.

When the electrical steel sheet is bent on a rod-shaped cylinder, a minimum diameter of an insulating coating layer that is not peeled or cracked may be less than 25 mm.

In the electrical steel sheet, $R/H_{hill-up}$ may be 0.02 to 1.0.

Another embodiment of the present invention provides a manufacturing method of a grain-oriented electrical steel sheet, including: manufacturing a cold-rolled sheet; forming a groove in the cold-rolled sheet; removing an Fe—O oxide formed on a surface of the cold-rolled sheet; primary recrystallization annealing the cold-rolled sheet; and applying an annealing separating agent to the primary recrystallized cold-rolled sheet, and secondary recrystallization annealing it, wherein a close contacting property coefficient calculated by Formula 1 below is 0.016 to 1.13.

$$\text{close contacting property coefficient } (S_{ad})=(0.8\times R)/H_{hill-up} \quad \text{[Formula 1]}$$

(In Formula 1, R represents the average roughness (μm) of the surface of the cold-rolled sheet after the removing of the oxide, and $H_{hill-up}$ represents the average height (μm) of the hill-up present on the surface of the cold-rolled sheet after the removing of the oxide.)

After the removing of the oxide, the average roughness (R) of the surface of the cold-rolled sheet may be 3.0 μm or less.

After the removing of the oxide, the average height ($H_{hill-up}$) of the hill-up present on the surface of the cold-rolled sheet may be 5.0 μm or less.

In the forming of the groove, the cold-rolled sheet may be irradiated with a laser beam or plasma to form the groove.

In the forming of the groove, a re-solidification layer may be formed below the groove.

Before the removing of the oxide, the average roughness (R) of the surface of the cold-rolled sheet may be 1.2 μm or more.

According to the embodiment of the present invention, by appropriately controlling a close contacting coefficient to appropriately form an island under a groove, it is possible to improve a close contacting property and corrosion resistance.

MODE FOR INVENTION

It will be understood that, although the terms first, second, third, etc. may be used herein to describe various elements, components, regions, areas, zones, layers, and/or sections, they are not limited thereto. These terms are only used to distinguish one element, component, region, area, zone, layer, or section from another element, component, region, layer, or section. Therefore, a first part, component, region, area, zone, layer, or section to be described below may be referred to as second part, component, area, layer, or section within the range of the present invention.

The technical terms used herein are to simply mention a particular embodiment and are not meant to limit the present invention. An expression used in the singular encompasses an expression of the plural, unless it has a clearly different meaning in the context. In the specification, it is to be understood that the terms such as "including", "having", etc., are intended to indicate the existence of specific features, regions, numbers, stages, operations, elements, components, and/or combinations thereof disclosed in the specification, and are not intended to preclude the possibility that one or more other features, regions, numbers, stages, operations, elements, components, and/or combinations thereof may exist or may be added.

When referring to a part as being "on" or "above" another part, it may be positioned directly on or above another part, or another part may be interposed therebetween. In contrast, when referring to a part being "directly above" another part, no other part is interposed therebetween.

Unless otherwise defined, all terms used herein, including technical or scientific terms, have the same meanings as those generally understood by those with ordinary knowledge in the field of art to which the present invention belongs. Terms defined in commonly used dictionaries are further interpreted as having meanings consistent with the relevant technical literature and the present disclosure, and are not to be construed as having idealized or very formal meanings unless defined otherwise.

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

Figure 1:
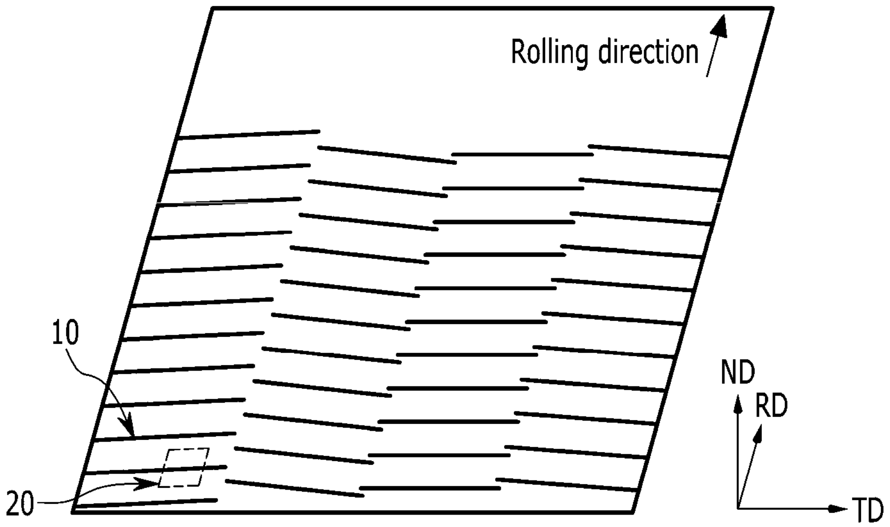
FIG. 1 illustrates a schematic view of a rolled surface (ND surface) of a grain-oriented electrical steel sheet according to an embodiment of the present invention.

FIG. 1 illustrates a schematic view of a grain-oriented electrical steel sheet 10 that is magnetic-domain-refined by an embodiment of the present invention.

As shown in FIG. 1, a grain-oriented electrical steel sheet 10 according to an embodiment of the present invention is provided with a linear groove 20 formed in a direction crossing a rolling direction (RD direction) on one surface or both surfaces of the electrical steel sheet.

Hereinafter, respective steps will be specifically described.

First, a cold-rolled sheet is manufactured. An embodiment of the present invention is characterized in a magnetic domain refining method after the cold-rolled sheet is manufactured, and the cold-rolled sheet to be subjected to magnetic domain refining may be a cold-rolled sheet used in a field of grain-oriented electrical steel sheets without limitation. Particularly, an effect of the present invention is realized regardless of an alloy composition of the grain-oriented electrical steel sheet. Therefore, a detailed description of the alloy composition of the grain-oriented electrical steel sheet will be omitted. For example, the cold-rolled sheet may include, in wt %, C at 0.07% or less, Si at 1.0 to 6.5%, Mn at 0.005 to 3.0%, Nb+V+Ti at 0.050% or less, Cr+Sn at 1.0% or less, Al at 3.0% or less, P+S at 0.08% or less, a total of rare earths and other impurities at 0.3%, and the balance of Fe.

Manufacturing methods of the cold-rolled sheet used in a grain-oriented electrical steel sheet field may be used for the manufacturing method of the cold-rolled sheet without limitation, and a detailed description thereof will be omitted.

Next, a groove is formed in the cold-rolled sheet.

In the forming of the groove, 2 to 10 grooves may be intermittently formed with respect to the rolling vertical direction. FIG. 1 shows an example in which four grooves are intermittently formed with respect to the rolling vertical direction. However, the present invention is not limited thereto, and it is also possible to continuously form grooves.

Figure 2:
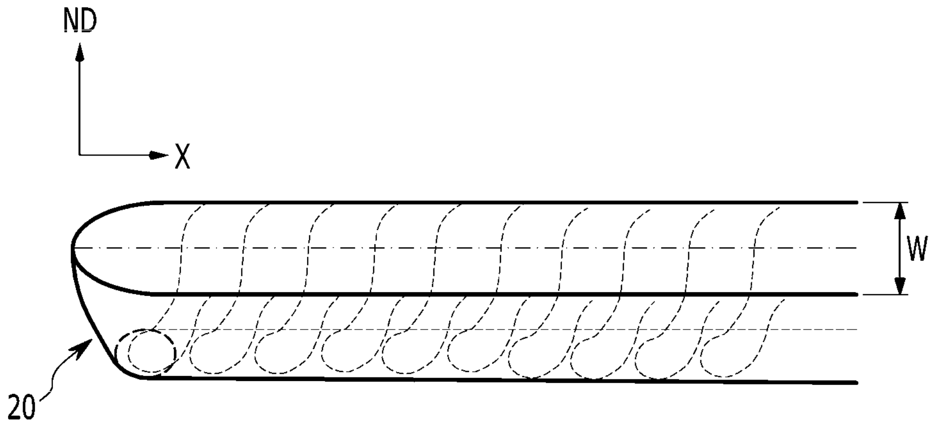
FIG. 2 illustrates a schematic view of a groove according to an embodiment of the present invention.

As shown in FIG. 1 and FIG. 2, a length direction (an RD direction of FIG. 1 or an X direction of FIG. 2) and the rolling direction (RD direction) of the groove 20 may form an angle of 75 to 88°. When forming the groove 20 at the above-described angle, it may contribute to improving the iron loss of the grain-oriented electrical steel sheet.

A width W of the groove may be 10 to 200 μm. When the width of the groove 20 is narrow or wide, it may not be possible to obtain an appropriate magnetic domain refining effect.

In addition, a depth H of the groove may be 30 μm or less. When the depth H of the groove is too deep, texture characteristics of the steel sheet 10 are significantly changed due to strong laser irradiation, or a large amount of hill-up and spatter are formed, so that magnetic properties may be deteriorated. Therefore, it is possible to control the depth of the groove 20 in the above-described range. More specifically, the depth of the groove may be 3 to 30 μm.

In the forming of the groove, the groove may be formed by irradiating the cold-rolled sheet with a laser beam or plasma.

When using the laser, the groove may be formed by irradiating a TEMoo ($M_2 \leq 1.25$) laser beam having an average power of 500 W to 10 KW on a surface of the cold-rolled sheet. A laser oscillation method may be used without limitation. That is, a continuous oscillation or pulsed mode may be used. In this way, the laser beam is irradiated so that a surface beam absorption rate is greater than or equal to heat of melting the steel sheet, thereby forming the groove 20 shown in FIG. 1 and FIG. 2. In FIG. 2, the X direction represents a length direction of the groove 20.

As such, in the case of using the laser beam or plasma, a re-solidification layer may be formed below the groove by heat emitted from the laser beam or plasma. The re-solidification layer is distinguished because an overall structure and grain size of the electrical steel sheet being manufactured are different. A thickness of the re-solidification layer may be formed to be 5.0 μm or less. When the thickness of the re-solidification layer is too thick, a metal oxide layer to be described later is formed thick, so that a close contacting property and corrosion resistance of the metal oxide layer and the base structure may be deteriorated.

After the forming of the groove, the surface of the steel sheet may be partially oxidized by heat generated from the laser beam or plasma, oxygen and moisture in the air, and oxygen and moisture in the injection gas, so that an Fe—O oxide may exist.

In the embodiment of the present invention, the Fe—O oxide formed on the surface of the cold-rolled sheet is removed. The method of removing the Fe—O oxide is not particularly limited, and a dry or wet polishing method may be used. After the polishing, since the Fe—O oxide may be introduced into the groove, it may be subjected to a rinsing process to remove it.

The Fe—O oxide refers to iron oxides such as $Fe_2O_3$ and $Fe_3O_4$. All or a portion of the Fe—O oxide may be removed.

Before removing the Fe—O oxide, an average roughness (R) of the surface of the cold-rolled sheet is 1.2 μm or more. In this case, when a subsequent process is performed without removing the Fe—O oxide, the metal oxide layer in an area of the groove is unstable, and thus the close contacting property and corrosion resistance may be deteriorated.

After removing the Fe—O oxide, the average roughness (R) of the surface of the cold-rolled sheet may be 3.0 μm or less. By removing the Fe—O oxide in the above-described range, the metal oxide layer is stably formed, so that the close contacting property and corrosion resistance may be improved. Preferably, the average roughness (R) of the surface of the cold-rolled sheet may be 0.05 to 0.30 μm.

In the process of removing the Fe—O oxide, a portion of a hill-up generated during the groove formation process may also be removed. When the hill-up is formed too high, the oxide layer is formed unstable, and thus the close contacting property and corrosion resistance may be deteriorated. Specifically, after the removing of the oxide, an average height ($H_{hill\text{-}up}$) of the hill-up present on the surface of the cold-rolled sheet may be 5.0 μm or less.

Next, the cold-rolled sheet is subjected to primary recrystallization annealing.

Since the primary recrystallization annealing is widely known in the field of grain-oriented electrical steel sheet, a detailed description thereof is omitted. In the primary recrystallization annealing process, decarburizing, or decarburizing and nitriding may be included, and annealing may be performed in a humid atmosphere for the decarburizing or the decarburizing and nitriding. A soaking temperature in the primary recrystallization annealing may be 800° C. to 950° C.

Next, an annealing separating agent is applied, and secondary recrystallization annealing is performed. Since the annealing separating agent is widely known, a detailed description thereof will be omitted. For example, the annealing separating agent including MgO as a main component may be used.

In the embodiment of the present invention, a close contacting property coefficient calculated by Formula 1 below is 0.016 to 1.13.

$$\text{close contacting property coefficient } (S_{ad}) = (0.8 \times R)/H_{hill\text{-}up} \quad \text{[Formula 1]}$$

(In Formula 1, R represents the average roughness (μm) of the surface of the cold-rolled sheet after the removing of the oxide, and $H_{hill\text{-}up}$ represents the average height (μm) of the hill-up present on the surface of the cold-rolled sheet after the removing of the oxide.)

When the close contacting property coefficient satisfies the above range, excellent close contacting property and corrosion resistance may be secured.

The purpose of the secondary recrystallization annealing is largely formation of {110}<001> texture by the secondary recrystallization, insulation-imparting by the formation of a metal oxide (glassy) film by reaction between the oxide layer formed during the primary recrystallization annealing and MgO, and removal of impurities that degrades magnetic properties. In the method of the secondary recrystallization annealing, in the heating section before the secondary recrystallization occurs, the mixture of nitrogen and hydrogen is maintained to protect the nitride, which is a particle growth inhibitor, so that the secondary recrystallization may develop well, and in the soaking after the secondary recrystallization is completed, impurities are removed by maintaining it in a 100% hydrogen atmosphere for a long time.

The secondary recrystallization annealing may be performed at a soaking temperature of 900 to 1210° C.

Figure 3:
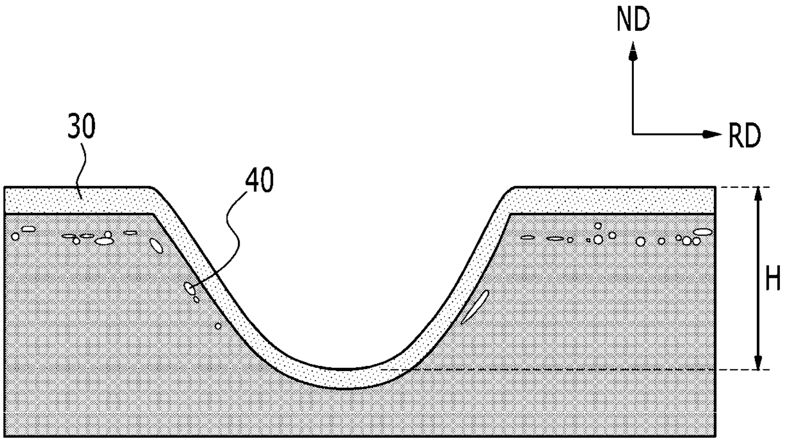
FIG. 3 illustrates a schematic view of a cross-section of a groove according to an embodiment of the present invention.

During the secondary recrystallization annealing process, the MgO component in the annealing separating agent reacts with the oxide layer formed on the surface of the steel sheet, thereby forming the metal oxide layer (forsterite layer) on the surfaces of the steel sheet and of the groove. In FIG. 3, the metal oxide layer 30 is schematically shown. In the embodiment of the present invention, since the groove is formed before the secondary recrystallization annealing, the metal oxide layer 30 may be formed not only on the steel sheet but also on the surface of the groove.

In the embodiment of the present invention, since the Fe—O oxide is removed from the surface of the steel sheet after the groove is formed, MgO in the annealing separating agent may penetrate or pass through the inside of the steel sheet to form an island 40 under the metal oxide layer 30. The island 40 includes a metal oxide. More specifically, it includes forsterite.

In FIG. 3, the island 40 is schematically shown. As shown in FIG. 3, the island 40 may be formed under the metal oxide layer 30 so as to be separated from the metal oxide layer 30. Since the island 40 is made of an alloy composition similar to that of the metal oxide layer 30, it is distinct from the electrical steel sheet base structure.

Since the island 40 is appropriately discontinuously formed, it may contribute to improving the close contacting property between the metal oxide layer 30 and the steel sheet. Specifically, the density of the islands including the metal oxide below the groove may be 0.5 pieces/$\mu m^2$ or less. In this case, a reference means the density of the islands with respect to a depth area within 5 μm below the groove 20 in the cross-section (TD surface) including the steel sheet rolling direction (RD direction) and the thickness direction (ND direction).

The island 40 positioned below the groove 20 may have an average particle diameter of 0.5 to 5 μm. In this case, a reference may be the cross-section (TD surface) including the steel sheet rolling direction (RD direction) and the thickness direction (ND direction). The particle diameter means, by assuming an imaginary circle with the same area as the area of the island 40 measured on the TD surface, a diameter of the circle. The average particle diameter of the island 40 is an average particle diameter of the island 40 positioned below the groove 20, and the island 40 positioned below a surface in which the groove 20 is not formed is excluded from the calculation of the above average particle diameter. By controlling the average particle diameter of the island 40, it is possible to improve the magnetism and the close contacting property with the insulating coating layer. More specifically, the island 40 positioned below the groove 20 may have an average particle diameter of 0.75 to 3 μm.

After the secondary recrystallization annealing, forming an insulating coating layer on the metal oxide layer may be further included.

A method of forming the insulating coating layer may be used without particular limitation, and for example, the insulating coating layer may be formed by applying an insulating coating solution containing a phosphate. It is preferable to use a coating solution containing colloidal silica and a metal phosphate as the insulating coating solution. In this case, the metal phosphate may be Al phosphate, Mg phosphate, or a combination thereof, and a content of Al, Mg, or a combination may be 15 wt % or more with respect to a weight of the insulating coating solution.

The grain-oriented electrical steel sheet according to the embodiment of the present invention includes the groove 20 positioned on the surface of the electrical steel sheet 10, the metal oxide layer 30 positioned on the groove 20, and the island 40 positioned below the groove.

The average particle diameter of the island 40 positioned below the groove may be 0.5 to 5 μm. When the metal oxide layer is too thin, the average particle diameter of the island is too small, resulting in poor close contacting property, and when the metal oxide layer is too thick, the average particle diameter of the island also excessively increases, resulting in decreasing the close contacting property of the metal oxide layer. The present invention controls the average particle diameter of the island 40, thereby improving the magnetism and improving the close contacting property between the insulating coating of the metal oxide layer and the base structure. Preferably, the island 40 positioned below the groove 20 may have an average particle diameter of 0.75 to 3 μm.

A density of the islands 40 below the groove 20 may be 0.5 pieces/$\mu m^2$ or less. In this case, a reference means the density of the islands with respect to a depth area within 5 μm below the groove 20 in the cross section (TD surface) including the steel sheet rolling direction (RD direction) and the thickness direction (ND direction). Preferably, the density of the islands 40 below the groove 20 may be 0.1 pieces/$\mu m^2$ or less.

Hereinafter, the present invention will be described in more detail through examples. However, the examples are only for illustrating the present invention, and the present invention is not limited thereto.

EXAMPLES

A cold-rolled sheet with a thickness of 0.23 mm was prepared. The cold-rolled sheet was irradiated with a 2.0 kW Gaussian mode of continuous wave laser beam at a scanning rate of 10 m/s to form 85° angled grooves with the RD direction. Next, an entire surface of the steel sheet was polished by using a polishing cloth to remove the Fe—O oxide. Next, the primary recrystallization annealing was performed, the MgO annealing separating agent was applied, and then the secondary recrystallization was performed. Then, the insulating coating layer was formed.

The close contacting property was indicated with the minimum diameter in which the insulating coating layer was not peeled and cracked by bending the product sheet to a rod-shaped cylinder having various diameters. The better the close contacting property, the diameter of the rod gradually decreases. Preferably, a minimum diameter of the cylinder in which the insulating coating layer is not peeled and cracked should be less than 25 mm. When it is 25 mm or more, the close contacting property is deteriorated, and the corrosion resistance decreases due to the deteriorated close contacting property. (The minimum diameter of the cylinder is 20 mm or 24 mm)

The corrosion resistance was measured with a natural corrosion current density through an anodic polarization experiment in a NaCl aqueous solution of 3.5 wt % at 30° C. The corrosion resistance is preferably $1.6\times10^{-9}$ or less.

The close contacting property coefficient of the electrical steel sheet according to the present invention is preferably 0.016 to 1.13. When the close contacting property coefficient is less than 0.016, the corrosion resistance may be rapidly deteriorated, while when the close contacting property coefficient is more than 1.13, the corrosiveness may be deteriorated. A formula for calculating the close contacting property coefficient is as follows.

A viscosity of the annealing separating agent is preferably 10 to 84. Because, when the viscosity is less than 10, the annealing separating agent may flow down, and when the viscosity exceeds 84, the thickness becomes too thick so that the consumption of the annealing separating agent increases. Therefore, when considering the viscosity of the conventional annealing separating agent, the $R/H_{hill\text{-}up}$ of the electrical steel sheet of the present invention is preferably 0.02 to 1.0.

$$\text{close contacting property coefficient } (S_{ad})=(0.8\times R)/H_{hill\text{-}up} \quad \text{[Formula 1]}$$

(In Formula 1, R represents the average roughness (μm) of the surface of the cold-rolled sheet after the removing of the oxide, and $H_{hill\text{-}up}$ represents the average height (μm) of the hill-up present on the surface of the cold-rolled sheet after the removing of the oxide.)

TABLE 1

| Classification | Average particle diameter (μm) | Minimum diameter of cylinder (Φ, mm) | Close contacting property coefficient (No order) | $R/H_{hill\text{-}up}$ | Corrosion resistance (A/cm$^2$) |
|---|---|---|---|---|---|
| Example 1 | 5.0 | 16 | 0.016 | 0.02 | $1.42 \times 10^{-9}$ |
| Example 2 | 4.2 | 16 | 0.02 | 0.025 | $1.45 \times 10^{-9}$ |
| Example 3 | 3.4 | 15 | 0.04 | 0.05 | $1.35 \times 10^{-9}$ |
| Example 4 | 1.3 | 15 | 0.06 | 0.07 | $1.37 \times 10^{-9}$ |
| Example 5 | 2.1 | 12 | 0.08 | 0.10 | $1.29 \times 10^{-9}$ |
| Example 6 | 1.9 | 12 | 0.10 | 0.12 | $1.25 \times 10^{-9}$ |
| Example 7 | 0.8 | 12 | 0.25 | 0.31 | $1.13 \times 10^{-9}$ |
| Example 8 | 0.5 | 12 | 0.40 | 0.50 | $1.10 \times 10^{-9}$ |
| Example 9 | 1.7 | 10 | 0.60 | 0.75 | $1.05 \times 10^{-9}$ |
| Example 10 | 1.3 | 10 | 0.80 | 1.00 | $1.02 \times 10^{-9}$ |
| Comparative example | 0.3 | 25 | 0.014 | 0.018 | $2.20 \times 10^{-8}$ |

As shown in Table 1, it can be confirmed that the grain-oriented electrical steel sheet manufactured by appropriately controlling the close contacting coefficient after the forming of the groove had an excellent close contacting property and corrosion resistance. On the other hand, it can be confirmed that the comparative example in which the close contacting coefficient was not properly controlled had a relatively poor close contacting property and corrosion resistance.

In addition, it was confirmed that the average particle diameter range of the islands 40 positioned below the grooves of Examples 1 to 10 was 0.5 to 5.0 μm. In addition, it was confirmed that the density of the islands 40 was 0.5 pieces/μm$^2$.

On the other hand, in the comparative example, it was confirmed that the average particle diameter of the islands 40 was less than 0.5 μm, and it was confirmed that a number of islands 40 having the density of the islands 40 exceeding 0.5 pieces/μm$^2$ were formed.

The present invention may be embodied in many different forms, and should not be construed as being limited to the disclosed embodiments. In addition, it will be understood by those skilled in the art that various changes in form and details may be made thereto without departing from the technical spirit and essential features of the present invention. Therefore, it is to be understood that the above-described embodiments are for illustrative purposes only, and the scope of the present invention is not limited thereto.

DESCRIPTION OF SYMBOLS

10: grain-oriented electrical steel sheet
20: groove
30: metal oxide layer
40: island

The invention claimed is:

1. A grain-oriented electrical steel sheet, comprising a groove positioned on a surface of an electrical steel sheet, a metal oxide layer positioned on the groove, and metal oxide-based islands that are discontinuously distributed from the groove and positioned below the groove, wherein an average particle diameter of the islands positioned below the groove is 0.5 to 3.4 μm wherein a density of the islands positioned below the groove is 0.5 pieces/μm$^2$ or less.

2. The grain-oriented electrical steel sheet of claim 1, wherein when the electrical steel sheet is bent on a rod-shaped cylinder, a minimum diameter of an insulating coating layer that is not peeled or cracked is less than 25 mm.

3. The grain-oriented electrical steel sheet of claim 1, wherein in the electrical steel sheet, $R/H_{hill\text{-}up}$ is 0.02 to 1.0, wherein R represents the average roughness (μm) of the surface of the cold-rolled sheet after the removing of oxide, and $H_{hill\text{-}up}$ represents the average height of the hill-up present on the surface of the cold-rolled sheet after the removing of the oxide.

4. The grain-oriented electrical steel sheet of claim 1, wherein the metal oxide-based islands are not in contact with a boundary between the groove and the metal oxide layer.

5. The grain-oriented electrical steel sheet of claim 1, wherein the average particle diameter of the islands positioned below the groove is 0.75 to 3 μm.

6. The grain-oriented electrical steel sheet of claim 1, wherein the density of the islands positioned below the groove is 0.1 pieces/μm$^2$ or less.

7. The grain-oriented electrical steel sheet of claim 1, wherein the metal oxide-based islands includes forsterite.

* * * * *